US010395488B2

(12) United States Patent
Cruz-Hernandez et al.

(10) Patent No.: US 10,395,488 B2
(45) Date of Patent: *Aug. 27, 2019

(54) SYSTEMS AND METHODS FOR GENERATING HAPTIC EFFECTS ASSOCIATED WITH AN ENVELOPE IN AUDIO SIGNALS

(71) Applicant: Immersion Corporation, San Jose, CA (US)

(72) Inventors: Juan Manuel Cruz-Hernandez, Montreal (CA); Jamal Saboune, Montreal (CA)

(73) Assignee: Immersion Corporation, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/906,260

(22) Filed: Feb. 27, 2018

(65) Prior Publication Data
US 2018/0190088 A1 Jul. 5, 2018

Related U.S. Application Data

(63) Continuation of application No. 15/404,380, filed on Jan. 12, 2017, now Pat. No. 9,934,660, which is a
(Continued)

(51) Int. Cl.
G08B 6/00 (2006.01)
G06F 3/01 (2006.01)
(Continued)

(52) U.S. Cl.
CPC ............... G08B 6/00 (2013.01); G06F 3/016 (2013.01); G06F 3/165 (2013.01); G10L 21/16 (2013.01); H04L 27/265 (2013.01)

(58) Field of Classification Search
CPC ............... G06F 3/016; G06F 17/30386; G06F 17/30516; G06F 2203/013;
(Continued)

(56) References Cited

U.S. PATENT DOCUMENTS 4,250,637 A 2/1981 Scott
4,382,251 A 5/1983 Fujisawa
(Continued)

FOREIGN PATENT DOCUMENTS

CN 1546290 A 11/2004
CN 1599925 A 3/2005
(Continued)

OTHER PUBLICATIONS

U.S. Appl. No. 15/617,172, "Office Action", dated Mar. 5, 2018, dated 30 pages.
(Continued)

Primary Examiner — Emily C Terrell
(74) Attorney, Agent, or Firm — Kilpatrick Townsend & Stockton LLP

(57) ABSTRACT

Systems and methods for generating haptic effects associated with envelopes in audio signals are disclosed. One disclosed system for outputting haptic effects includes a processor configured to: receive an audio signal; determine an envelope associated with the audio signal; determine a haptic effect based in part on the envelope; and output a haptic signal associated with the haptic effect.

23 Claims, 10 Drawing Sheets

Related U.S. Application Data continuation of application No. 14/078,442, filed on Nov. 12, 2013, now Pat. No. 9,576,445.

(60) Provisional application No. 61/874,933, filed on Sep. 6, 2013.

(51) Int. Cl.
*G10L 21/16* (2013.01)
*G06F 3/16* (2006.01)
*H04L 27/26* (2006.01)

(58) Field of Classification Search
CPC .... G06F 2203/014; G06F 3/165; G06F 1/163; G06F 3/005; G06F 3/0414; G08B 6/00; A63F 13/00; A63F 13/285; A63F 13/424; H04W 4/008
USPC ...................... 340/407.1–407.2, 7.6
See application file for complete search history.

(56) References Cited

U.S. PATENT DOCUMENTS

| | | | |
|---|---|---|---|
| 5,056,251 | A | 10/1991 | Shurart |
| 5,388,992 | A | 2/1995 | Franklin et al. |
| 5,684,722 | A | 11/1997 | Thorner et al. |
| 6,397,154 | B1 | 5/2002 | Jones et al. |
| 6,408,696 | B1 | 6/2002 | Jong |
| 6,650,338 | B1 | 11/2003 | Kolarov et al. |
| 7,020,701 | B1 | 3/2006 | Gelvin et al. |
| 7,159,008 | B1 | 1/2007 | Wies et al. |
| 7,208,671 | B2 | 4/2007 | Chu |
| 7,640,139 | B2 | 12/2009 | Sahara et al. |
| 7,757,171 | B1 | 7/2010 | Wong et al. |
| 7,761,204 | B2 | 7/2010 | König |
| 7,816,838 | B2 | 10/2010 | Leskinen et al. |
| 8,016,610 | B1 | 9/2011 | Lee et al. |
| 8,068,025 | B2 | 11/2011 | Devenyi et al. |
| 8,493,354 | B1 | 7/2013 | Birnbaum et al. |
| 8,593,420 | B1 | 11/2013 | Buuck |
| 8,634,928 | B1 | 1/2014 | O'Driscoll et al. |
| 8,655,663 | B2 | 2/2014 | Matsuoka et al. |
| 8,665,076 | B2 | 3/2014 | Okimoto et al. |
| 8,688,251 | B2 | 4/2014 | Ullrich et al. |
| 8,717,152 | B2 | 5/2014 | Bhatia et al. |
| 8,754,758 | B1 | 6/2014 | Viegas et al. |
| 8,798,534 | B2 | 8/2014 | Rodriguez et al. |
| 8,849,663 | B2 | 9/2014 | Bradley et al. |
| 8,896,524 | B2 | 11/2014 | Birnbaum et al. |
| 8,976,980 | B2 | 3/2015 | Tsutsui et al. |
| 9,489,965 | B2 | 11/2016 | Scheffer et al. |
| 9,513,706 | B2 | 12/2016 | Cruz-Hernandez et al. |
| 9,576,445 | B2 | 2/2017 | Saboune et al. |
| 9,652,945 | B2 | 5/2017 | Levesque et al. |
| 9,711,014 | B2 | 7/2017 | Cruz-Hernandez et al. |
| 9,928,701 | B2 | 3/2018 | Levesque et al. |
| 9,934,660 | B2 | 4/2018 | Cruz-Hernandez et al. |
| 9,947,188 | B2 | 4/2018 | Cruz-Hernandez et al. |
| 10,140,823 | B2 | 11/2018 | Levesque et al. |
| 2002/0151992 | A1 | 10/2002 | Hoffberg et al. |
| 2002/0178012 | A1 | 11/2002 | Wang et al. |
| 2003/0067440 | A1 | 4/2003 | Rank |
| 2003/0068053 | A1 | 4/2003 | Chu |
| 2003/0188020 | A1 | 10/2003 | Barile |
| 2004/0031058 | A1 | 2/2004 | Reisman |
| 2004/0094021 | A1* | 5/2004 | Ludwig .................. G10H 1/00 84/625 |
| 2004/0161118 | A1 | 8/2004 | Chu |
| 2004/0252851 | A1 | 12/2004 | Braun et al. |
| 2005/0223237 | A1 | 10/2005 | Barletta et al. |
| 2006/0010230 | A1 | 1/2006 | Karklins et al. |
| 2006/0017691 | A1 | 1/2006 | Cruz-Hernandez et al. |
| 2007/0178942 | A1 | 8/2007 | Sadler et al. |
| 2007/0193436 | A1 | 8/2007 | Chu |
| 2007/0242040 | A1 | 10/2007 | Ullrich et al. |
| 2008/0098331 | A1 | 4/2008 | Novick et al. |
| 2008/0102902 | A1 | 5/2008 | Epley |
| 2008/0103558 | A1 | 5/2008 | Wenzel et al. |
| 2008/0123725 | A1 | 5/2008 | J et al. |
| 2008/0165081 | A1 | 7/2008 | Lawther et al. |
| 2009/0049092 | A1 | 2/2009 | Capio et al. |
| 2009/0069081 | A1 | 3/2009 | Thorner |
| 2009/0096632 | A1 | 4/2009 | Ullrich et al. |
| 2009/0128306 | A1 | 5/2009 | Luden et al. |
| 2009/0231276 | A1 | 9/2009 | Ullrich et al. |
| 2009/0306985 | A1 | 12/2009 | Roberts et al. |
| 2009/0327894 | A1 | 12/2009 | Rakib et al. |
| 2010/0004033 | A1 | 1/2010 | Choe et al. |
| 2010/0013653 | A1 | 1/2010 | Birnbaum et al. |
| 2010/0114253 | A1 | 5/2010 | Wahlstrand |
| 2010/0153995 | A1 | 6/2010 | Belz et al. |
| 2010/0217413 | A1 | 8/2010 | Seiler |
| 2010/0228530 | A1 | 9/2010 | Valero et al. |
| 2010/0268745 | A1 | 10/2010 | Choi et al. |
| 2010/0274817 | A1 | 10/2010 | Choi et al. |
| 2010/0278512 | A1 | 11/2010 | Ryu et al. |
| 2010/0302033 | A1 | 12/2010 | Devenyi et al. |
| 2011/0018697 | A1 | 1/2011 | Birnbaum et al. |
| 2011/0063208 | A1 | 3/2011 | Van Den Eerenbeemd et al. |
| 2011/0093100 | A1 | 4/2011 | Ramsay |
| 2011/0099596 | A1 | 4/2011 | Ure et al. |
| 2011/0102160 | A1 | 5/2011 | Heubel et al. |
| 2011/0124413 | A1 | 5/2011 | Levanon |
| 2011/0125787 | A1 | 5/2011 | Choi et al. |
| 2011/0125788 | A1 | 5/2011 | Joo et al. |
| 2011/0125789 | A1 | 5/2011 | Joo et al. |
| 2011/0125790 | A1 | 5/2011 | Choi et al. |
| 2011/0128132 | A1 | 6/2011 | Ullrich et al. |
| 2011/0137137 | A1 | 6/2011 | Shin et al. |
| 2011/0169908 | A1 | 7/2011 | Lee et al. |
| 2011/0188832 | A1 | 8/2011 | Choi et al. |
| 2011/0216179 | A1 | 9/2011 | Dialameh et al. |
| 2011/0254671 | A1 | 10/2011 | Okimoto et al. |
| 2011/0281535 | A1 | 11/2011 | Low et al. |
| 2012/0019352 | A1 | 1/2012 | Ménard et al. |
| 2012/0021389 | A1 | 1/2012 | Wakamoto et al. |
| 2012/0028577 | A1 | 2/2012 | Rodriguez et al. |
| 2012/0032906 | A1 | 2/2012 | Lemmens et al. |
| 2012/0059697 | A1 | 3/2012 | Lin et al. |
| 2012/0070085 | A1 | 3/2012 | Arn |
| 2012/0093216 | A1 | 4/2012 | Black |
| 2012/0099734 | A1 | 4/2012 | Joly et al. |
| 2012/0150928 | A1 | 6/2012 | Ward et al. |
| 2012/0197644 | A1 | 8/2012 | Nagano et al. |
| 2012/0200520 | A1 | 8/2012 | Harris |
| 2012/0206246 | A1 | 8/2012 | Cruz-Hernandez et al. |
| 2012/0206247 | A1 | 8/2012 | Bhatia et al. |
| 2012/0216666 | A1 | 8/2012 | Fresolone |
| 2012/0245721 | A1 | 9/2012 | Story, Jr. et al. |
| 2012/0268412 | A1 | 10/2012 | Cruz-Hernandez et al. |
| 2012/0306631 | A1 | 12/2012 | Hughes |
| 2012/0308971 | A1 | 12/2012 | Shin et al. |
| 2012/0310587 | A1 | 12/2012 | Tu et al. |
| 2013/0038792 | A1 | 2/2013 | Quigley et al. |
| 2013/0044049 | A1 | 2/2013 | Biggs et al. |
| 2013/0063256 | A1 | 3/2013 | Tartz et al. |
| 2013/0086178 | A1 | 4/2013 | Osborne et al. |
| 2013/0155110 | A1 | 6/2013 | Wu et al. |
| 2013/0163785 | A1 | 6/2013 | Lee et al. |
| 2013/0227410 | A1 | 8/2013 | Sridhara et al. |
| 2013/0229271 | A1 | 9/2013 | Fantauzza et al. |
| 2013/0245980 | A1 | 9/2013 | Forbes et al. |
| 2013/0265270 | A1 | 10/2013 | Tempas et al. |
| 2013/0265286 | A1 | 10/2013 | Da Costa et al. |
| 2013/0265502 | A1 | 10/2013 | Huebner |
| 2013/0278536 | A1 | 10/2013 | Nakamura et al. |
| 2013/0307786 | A1 | 11/2013 | Heubel |
| 2013/0307829 | A1 | 11/2013 | Libin |
| 2013/0311881 | A1 | 11/2013 | Birnbaum et al. |
| 2013/0314514 | A1 | 11/2013 | Mochinaga et al. |
| 2013/0316826 | A1 | 11/2013 | Levanon |
| 2013/0325456 | A1 | 12/2013 | Takagi et al. |
| 2013/0326552 | A1 | 12/2013 | Adams |
| 2014/0028111 | A1 | 1/2014 | Hansen et al. |

(56) References Cited

U.S. PATENT DOCUMENTS

| | | |
|---|---|---|
| 2014/0039796 A1 | 2/2014 | Thompson et al. |
| 2014/0055358 A1 | 2/2014 | Birnbaum et al. |
| 2014/0056461 A1 | 2/2014 | Afshar |
| 2014/0071291 A1 | 3/2014 | Yu |
| 2014/0074945 A1 | 3/2014 | Kanevsky et al. |
| 2014/0118125 A1 | 5/2014 | Bhatia |
| 2014/0176415 A1 | 6/2014 | Buuck et al. |
| 2014/0179439 A1 | 6/2014 | Miura et al. |
| 2014/0205260 A1 | 7/2014 | Lacroix et al. |
| 2014/0215380 A1 | 7/2014 | Kang et al. |
| 2014/0237495 A1 | 8/2014 | Jang et al. |
| 2014/0267904 A1 | 9/2014 | Saboune et al. |
| 2014/0267911 A1 | 9/2014 | Grant et al. |
| 2014/0269893 A1 | 9/2014 | Parikh et al. |
| 2014/0270681 A1 | 9/2014 | Sen et al. |
| 2014/0347177 A1 | 11/2014 | Phan et al. |
| 2014/0368349 A1 | 12/2014 | Ostyn et al. |
| 2015/0070146 A1 | 3/2015 | Cruz-Hernandez et al. |
| 2015/0070147 A1 | 3/2015 | Cruz-Hernandez et al. |
| 2015/0070148 A1 | 3/2015 | Cruz-Hernandez et al. |
| 2015/0070150 A1 | 3/2015 | Levesque et al. |
| 2015/0070265 A1 | 3/2015 | Cruz-Hernandez et al. |
| 2015/0097658 A1 | 4/2015 | Yagi et al. |
| 2015/0199015 A1 | 7/2015 | Ullrich et al. |
| 2015/0333413 A1 | 11/2015 | Piazza et al. |
| 2016/0004311 A1 | 1/2016 | Yliaho |
| 2017/0162010 A1 | 6/2017 | Cruz-Hernandez et al. |
| 2019/0057583 A1 | 2/2019 | Levesque et al. |

FOREIGN PATENT DOCUMENTS

| | | | |
|---|---|---|---|
| CN | 1620327 A | | 5/2005 |
| CN | 101292211 A | | 10/2008 |
| CN | 101828382 A | | 9/2010 |
| CN | 102341766 A | | 2/2012 |
| CN | 102597914 A | | 7/2012 |
| CN | 102750957 A | | 10/2012 |
| CN | 103247296 A | | 8/2013 |
| CN | 104423592 A | | 3/2015 |
| CN | 104423593 A | | 3/2015 |
| CN | 104423594 A | | 3/2015 |
| CN | 104427390 A | | 3/2015 |
| CN | 104423592 | | 10/2018 |
| CN | 104423593 | | 10/2018 |
| CN | 104423594 | | 12/2018 |
| EP | 2 624 099 A1 | | 8/2013 |
| EP | 2378876 | | 11/2018 |
| JP | 10506508 | | 6/1998 |
| JP | 2005-523612 A | | 8/2005 |
| JP | 2009-159125 A | | 7/2009 |
| JP | 2009533714 | | 9/2009 |
| JP | 2009-540725 A | | 11/2009 |
| JP | 2011-501575 A | | 1/2011 |
| JP | 2012027509 | | 2/2012 |
| JP | 2012159596 | | 8/2012 |
| JP | 2012168947 | | 9/2012 |
| JP | 2012178171 | | 9/2012 |
| JP | 2012520516 | | 9/2012 |
| JP | 2013161473 | | 8/2013 |
| JP | 2013168153 | | 8/2013 |
| JP | 2015-053048 | | 3/2015 |
| JP | 2015-053052 | | 3/2015 |
| JP | 2015-053053 | | 3/2015 |
| JP | 2015-053054 | | 3/2015 |
| JP | 2015-509308 A | | 3/2015 |
| WO | 1998/27802 | | 7/1998 |
| WO | 0063879 | | 10/2000 |
| WO | 2003/032289 A1 | | 4/2003 |
| WO | 2004/030341 A1 | | 4/2004 |
| WO | 2005/048541 A1 | | 5/2005 |
| WO | 2006043511 | | 4/2006 |
| WO | 2009/051976 A1 | | 4/2009 |
| WO | 2011027535 | | 3/2011 |
| WO | 2012/086208 A1 | | 6/2012 |
| WO | 2013/096327 A1 | | 6/2013 |

OTHER PUBLICATIONS

CN 201410452984.7, "Office Action", dated Feb. 6, 2018, 9 pages.
CN 201410453219.7, "Office Action", dated Feb. 5, 2018, 8 pages.
EP 14183981.1, "Office Action", dated Feb. 23, 2018, 4 pages.
U.S. Appl. No. 15/617,172, "Non-Final Office Action", dated Jul. 19, 2018, 38 pages.
U.S. Appl. No. 14/078,438, Non Final Office Action dated Oct. 6, 2016.
U.S. Appl. No. 14/078,438, Final Office Action dated Feb. 4, 2016.
U.S. Appl. No. 14/078,438, Non-Final Office Action dated Jul. 16, 2015.
U.S. Appl. No. 14/078,442, Non-Final Office Action dated May 26, 2016.
U.S. Appl. No. 14/078,442, Final Office Action dated Jan. 6, 2016.
U.S. Appl. No. 14/078,442, Non-Final Office Action dated Sep. 14, 2015.
U.S. Appl. No. 14/078,442, Non-Final Office Action dated Apr. 3, 2015.
U.S. Appl. No. 14/078,445, Final Office Action dated Oct. 25, 2016.
U.S. Appl. No. 14/078,445, Non-Final Office Action dated May 26, 2016.
U.S. Appl. No. 14/078,445, Final Office Action dated Nov. 18, 2015.
U.S. Appl. No. 14/078,445, Non-Final Office Action dated Jul. 20, 2015.
U.S. Appl. No. 14/145,650, Final Office Action dated Sep. 23, 2016.
U.S. Appl. No. 14/145,650, Non-Final Office Action dated Feb. 23, 2016.
U.S. Appl. No. 14/145,650, Final Office Action dated Aug. 26, 2015.
U.S. Appl. No. 14/145,650, Non-Final Office Action dated Mar. 26, 2015.
European Patent Office Application No. 14183978.7, Extended European Search Report dated Mar. 20, 2015.
European Patent Office Application No. 14183980.3, Extended European Search Report dated Mar. 31, 2015.
European Patent Office Application No. 14183981.1, Extended European Search Report dated Mar. 25, 2015.
European Patent Office Application No. 14183983.7, Extended European Search Report dated Apr. 9, 2015.
Lee et al., "Haptic interaction with user manipulation for smartphone", Consumer Electronics (ICCE), 2013 IEEE International Conference, Jan. 11, 2013, pp. 47-48.
Patent Cooperation Treaty US2017/021403, International Search Report and Written Opinion dated May 23, 2017.
U.S. Appl. No. 15/889,301, "Non-Final Office Action", dated Apr. 4, 2018, 22 pages.
CN 201410452996.X, "Office Action", dated Mar. 28, 2018, 12 pages.
CN 201410453859.8, "Office Action", dated Apr. 4, 2018, 9 pages.
EP 14183980.3, "Communication Pursuant to Article 94(3) EPC", dated Mar. 13, 2018, 4 pages.
EP 14183981.1, "Communication Pursuant to Article 94(3) EPC", dated Feb. 23, 2018, 4 pages.
EP 14183983.7, "Communication Pursuant to Article 94(3) EPC", dated Mar. 14, 2018, 4 pages.
Ishikawa et al., "Extraction of the Text Information from Terrestrial Teletext, Development of a Speech Server", Human Interface Society Reports of Research, vol. 6, No. 1, Jan. 22, 2004, pp. 133-136.
JP 2014-178052, "Office Action", dated Mar. 13, 2018, 3 pages.
U.S. Appl. No. 15/617,172, "Notice of Allowability", dated Feb. 12, 2019, 2 pages.
U.S. Appl. No.15/617,172, "Notice of Allowability", dated Feb. 14, 2019, 2 pages.
U.S. Appl. No. 15/617,172, "Notice of Allowance", dated Dec. 13, 2018, 14 pages.
U.S. Appl. No. 15/918,242, "Non-Final Office Action", dated Oct. 25, 2018, 18 pages.
Chinese App. CN201410452996.X, "Office Action", dated Nov. 9, 2018, 11 pages.
European App. EP14183981.1, "Office Action", dated Nov. 20, 2018, 4 pages.
Japanese App. JP2014-179759, "Notice of Decision to Grant", dated Feb. 5, 2019, 3 pages.

(56) References Cited

OTHER PUBLICATIONS

Japanese App. JP2014-179759, "Office Action", dated Oct. 30, 2018, 13 pages.
Japanese App. JP2014-179785, "Notice of Decision to Grant", dated Feb. 5, 2019, 3 pages.
Japanese App. JP2014-179785, "Office Action", dated Oct. 30, 2018, 4 pages.
Japanese App. JP2014-180754, "Office Action", dated Oct. 30, 2018, 12 pages.
CN 201410452996.X, "Office Action", dated Aug. 24, 2018, 16 pages.
JP 2014-178052, "Office Action", dated Aug. 28, 2018, 4 pages.
U.S. Appl. No. 16/166,434, "Notice of Allowance," dated Apr. 10, 2019, 10 pages.
EP 14183978.7, "Office Action," dated Mar. 7, 2019, 4 pages.
European Office Action EP14183980.3, "Office Action", dated May 17, 2019, 4 pages.
European Office Action EP14183983.7, "Office Action", dated Apr. 23, 2019, 6 pages.

* cited by examiner

SYSTEMS AND METHODS FOR GENERATING HAPTIC EFFECTS ASSOCIATED WITH AN ENVELOPE IN AUDIO SIGNALS

CROSS REFERENCE TO RELATED APPLICATIONS

This application is a continuation of and claims priority to U.S. patent application Ser. No. 15/404,380, filed on Jan. 12, 2017, and entitled "Systems and Methods For Generating Haptic Effects Associated With An Envelope In Audio Signals," which is a continuation of and claims priority to U.S. patent application Ser. No. 14/078,442 filed on Nov. 12, 2013 and entitled "Systems and Methods for Generating Haptic Effects Associated With an Envelope in Audio Signals," which claims priority to U.S. Provisional Application No. 61/874,933 filed on Sep. 6, 2013 and entitled "Audio to Haptics" the entirety of all of which is hereby incorporated herein by reference.

This application is related to U.S. patent application Ser. No. 14/078,438, filed the same day as U.S. patent application Ser. No. 14/078,442 and entitled "Systems and Methods for Generating Haptic Effects Associated with Transitions in Audio Signals," the entirety of which is hereby incorporated herein by reference.

This patent application is related to U.S. patent application Ser. No. 14/078,445, filed the same day as U.S. patent application Ser. No. 14/078,442 and entitled "Systems and Methods for Generating Haptic Effects Associated with Audio Signals," the entirety of which is hereby incorporated herein by reference.

FIELD OF THE INVENTION

The present invention generally relates to haptic feedback and more particularly to systems and methods for generating haptic effects associated with an envelope in audio signals.

BACKGROUND

Touch-enabled devices have become increasingly popular. For instance, mobile and other devices may be configured with touch-sensitive displays so that a user can provide input by touching portions of the touch-sensitive display. As another example, a touch-enabled surface separate from a display may be used for input, such as a trackpad, mouse, or other device. Furthermore, some touch-enabled devices make use of haptic effects, for example, haptic effects configured to simulate a texture or a friction on a touch-surface. In some devices these haptic effects may correlate to audio or other effects output by the device. However, due to latency in processing and outputting the audio and haptic effects, these effects may be less compelling. Thus, there is a need for improved haptic effects associated with audio effects.

SUMMARY

Embodiments of the present disclosure include devices featuring haptic effects felt on a touch area and associated with audio signals. These haptic effects may include, but are not limited to, changes in texture, changes in coefficient of friction, and/or simulation of boundaries, obstacles, or other discontinuities in the touch surface that can be perceived through use of an object in contact with the surface.

In one embodiment, a system of the present disclosure may comprise a processor configured to: receive an audio signal; determine an envelope associated with the audio signal; determine a haptic effect based in part on the envelope; and output a haptic signal associated with the haptic effect.

This illustrative embodiment is mentioned not to limit or define the limits of the present subject matter, but to provide an example to aid understanding thereof. Illustrative embodiments are discussed in the Detailed Description, and further description is provided there. Advantages offered by various embodiments may be further understood by examining this specification and/or by practicing one or more embodiments of the claimed subject matter.

BRIEF DESCRIPTION OF THE DRAWINGS

A full and enabling disclosure is set forth more particularly in the remainder of the specification. The specification makes reference to the following appended figures.

DETAILED DESCRIPTION

Figure 1A:
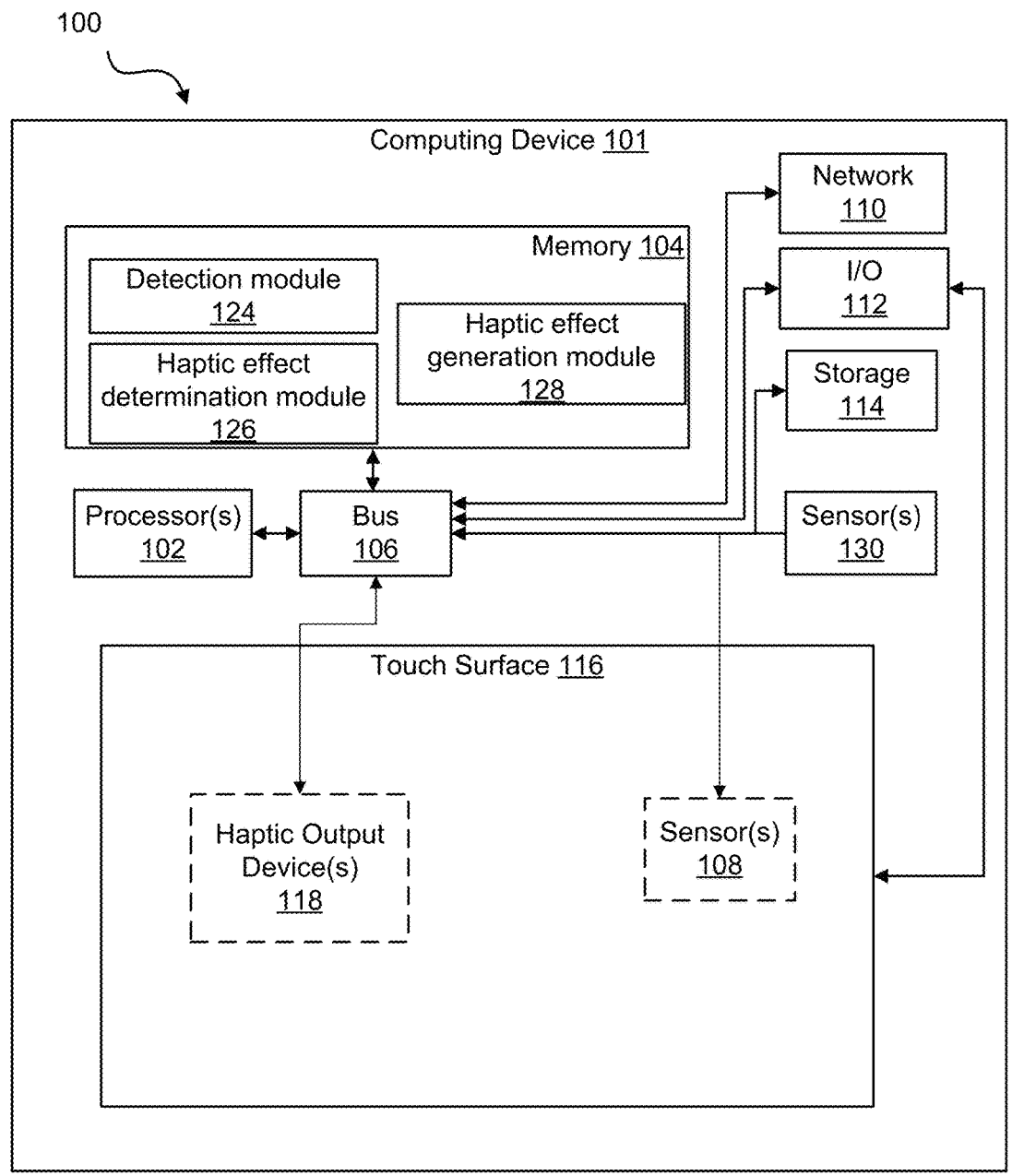
FIG. 1A shows an illustrative system for generating haptic effects associated with an envelope in audio signals.

Reference will now be made in detail to various and alternative illustrative embodiments and to the accompanying drawings. Each example is provided by way of explanation, and not as a limitation. It will be apparent to those skilled in the art that modifications and variations can be made. For instance, features illustrated or described as part of one embodiment may be used on another embodiment to yield a still further embodiment. Thus, it is intended that this disclosure include modifications and variations as come within the scope of the appended claims and their equivalents.

Illustrative Example of a Device for Generating Haptic Effects Associated with an Envelope in Audio Signals One illustrative embodiment of the present disclosure comprises a computing system, such as a smartphone, tablet, or portable music device. In some embodiments, the computing system may comprise a wearable device, or be embedded in furniture or clothes, or any other device with embedded actuators. The computing system can include and/or may be in communication with one or more sensors, such as an accelerometer, as well as sensors (e.g., optical, resistive, or capacitive) for determining a location of a touch relative to a display area corresponding in this example to the screen of the device.

As the user interacts with the device, one or more haptic output devices, for example, actuators are used to provide haptic effects. For example, a haptic effect may be output to simulate the presence of a texture on the surface of the device. In one such embodiment, as the user's finger moves across the surface, a vibration, electric field, or other effect may be output to simulate the feeling of a texture on the surface of the device. Similarly, in another embodiment, as the user moves a finger across the device, the perceived coefficient of friction of the screen can be varied (e.g., increased or decreased) based on the position, velocity, and/or acceleration of the finger or the length of time the finger has been in contact with the device. In other embodiments, the mobile device may output haptic effects such as vibrations, pops, clicks, or surface deformations. In some embodiments, haptic effects may be output for a certain period of time (e.g., 50 ms) when a certain event occurs. In other embodiments, the haptic effect may vary with a fixed period, e.g., in an embodiment, a texture may be output that varies at a 100 Hz rate, e.g., a 100 Hz sinusoid.

In the illustrative embodiment, the haptic effect comprises an effect associated with an audio signal. For example, in some embodiments, the haptic effect may comprise a haptic effect associated with an audio track. In some embodiments, the user may be listening to the audio track (e.g., using headphones, speakers, or some other type of audio output device) at the time the haptic effect is determined. In other embodiments, the haptic effect may be determined in advance as part of a "haptic track." This haptic track may be distributed along with the audio file, so that it may be played alongside the audio track. In some embodiments, the haptic track may be synched to the audio track such that haptic effects correspond to events in the audio track. In other embodiments, the haptic effect may be associated with an Audio-Visual ("AV") track, for example, the audio portion of a video file.

One illustrative embodiment of the present disclosure comprises systems and methods for determining an envelope of an audio signal for haptic effect generation. In such an embodiment, an envelope may comprise a curve that closely follows the time and frequency content of an audio signal. Such a system may then multiply this envelope by another signal. Determining the envelope of an audio signal may enable an audio to haptics system to locate areas where the audio signal is close to noise or is very low in magnitude. Such an illustrative system may automatically generate haptic effects based on the audio signal, but may use the envelope determination to locate the areas in the signal that are close to noise, and then avoid generation of haptic effects in or near those areas.

Further, in some embodiments, once a system determines an envelope associated with an audio signal, the system may then use that signal in combination with other haptic effect determination algorithms (e.g., frequency shifting) in order to determine haptic effects. In some embodiments, the haptic effects may be output in a coordinated or synchronized form along with the audio file. In other embodiments, these haptic effects may be stored in a haptic track that may be stored separately from the audio file. The haptic track may then be played separately from the audio file. In some embodiments, the haptic track may be distributed along with the audio file either as a bonus, or as an additional source of revenue for a content creator.

As will be discussed in further detail below, any number of features may be found in an audio signal. Embodiments of the present disclosure provide systems and methods for identifying these features, and then determining and outputting haptic effects that are associated with these features. Further, in some embodiments, the systems and methods discussed herein may be used to determine haptic effects associated with other types of signals, e.g., pressure, acceleration, velocity, or temperature signals.

Illustrative Systems for Generating Haptic Effects Associated with an Envelope in Audio Signals FIG. 1A shows an illustrative system 100 for generating haptic effects associated with an envelope in audio signals. Particularly, in this example, system 100 comprises a computing device 101 having a processor 102 interfaced with other hardware via bus 106. A memory 104, which can comprise any suitable tangible (and non-transitory) computer-readable medium such as RAM, ROM, EEPROM, or the like, embodies program components that configure operation of the computing device. In this example, computing device 101 further includes one or more network interface devices 110, input/output (I/O) interface components 112, and additional storage 114.

Network device 110 can represent one or more of any components that facilitate a network connection. Examples include, but are not limited to, wired interfaces such as Ethernet, USB, IEEE 1394, and/or wireless interfaces such as IEEE 802.11, Bluetooth, or radio interfaces for accessing cellular telephone networks (e.g., a transceiver/antenna for accessing a CDMA, GSM, UMTS, or other mobile communications network(s)).

I/O components 112 may be used to facilitate connection to devices such as one or more displays, keyboards, mice, speakers, microphones, cameras, and/or other hardware used to input data or output data. For example, in some embodiments, I/O components 112 may include speakers configured to play audio signals provided by processor 102. Storage 114 represents nonvolatile storage such as magnetic, optical, or other storage media included in device 101. In some embodiments, storage 114 may be configured to store audio files configured to be played to the user via I/O components 112.

System 100 further includes a touch surface 116, which, in this example, is integrated into device 101. Touch surface 116 represents any surface that is configured to sense touch input of a user. One or more sensors 108 are configured to detect a touch in a touch area when an object contacts a touch surface and provide appropriate data for use by processor 102. Any suitable number, type, or arrangement of sensors can be used. For example, resistive and/or capacitive sensors may be embedded in touch surface 116 and used to determine the location of a touch and other information, such as pressure. As another example, optical sensors with a view of the touch surface may be used to determine the touch position. In some embodiments, sensor 108 and touch surface 116 may comprise a touch screen or a touch-pad. For example, in some embodiments, touch surface 116 and sensor 108 may comprise a touch screen mounted overtop of a display configured to receive a display signal and output an image to the user. In other embodiments, the sensor 108 may comprise an LED detector. For example, in one embodiment, touch surface 116 may comprise an LED finger detector mounted on the side of a display. In some embodiments, the processor is in communication with a single sensor 108, in other embodiments, the processor is in communication with a plurality of sensors 108, for example, a first touch screen and a second touch screen. The sensor 108 is configured to detect user interaction, and based on the user interaction, transmit signals to processor 102. In some embodiments, sensor 108 may be configured to detect multiple aspects of the user interaction. For example, sensor 108 may detect the speed and pressure of a user interaction, and incorporate this information into the interface signal.

Device 101 further comprises a haptic output device 118. In the example shown in FIG. 1A haptic output device 118 is in communication with processor 102 and is coupled to touch surface 116. In some embodiments, haptic output device 118 is configured to output a haptic effect simulating a texture on the touch surface in response to a haptic signal. Additionally or alternatively, haptic output device 118 may provide vibrotactile haptic effects that move the touch surface in a controlled manner. Some haptic effects may utilize an actuator coupled to a housing of the device, and some haptic effects may use multiple actuators in sequence and/or in concert. For example, in some embodiments, a surface texture may be simulated by vibrating the surface at different frequencies. In such an embodiment, haptic output device 118 may comprise one or more of, for example, a piezoelectric actuator, an electric motor, an electro-magnetic actuator, a voice coil, a shape memory alloy, an electro-active polymer, a solenoid, an eccentric rotating mass motor (ERM), or a linear resonant actuator (LRA). In some embodiments, haptic output device 118 may comprise a plurality of actuators, for example an ERM and an LRA. In some embodiments, the haptic device 118 may comprise or be embedded in a wearable device, furniture, or clothing.

Although a single haptic output device 118 is shown here, embodiments may use multiple haptic output devices of the same or different type to output haptic effects, for example, to simulate surface textures or vary the perceived coefficient of friction on the touch surface. For example, in one embodiment, a piezoelectric actuator may be used to displace some or all of touch surface 116 vertically and/or horizontally at ultrasonic frequencies, such as by using an actuator moving at frequencies greater than 20-25 kHz in some embodiments. In some embodiments, multiple actuators such as eccentric rotating mass motors and linear resonant actuators can be used alone or in concert to provide different textures, variations in the coefficient of friction, or other haptic effects.

In still other embodiments, haptic output device 118 may apply electrostatic friction or attraction, for example, by use of an electrostatic surface actuator, to simulate a texture on the surface of touch surface 116. Similarly, in some embodiments, haptic output device 118 may use electrostatic attraction to vary the friction the user feels on the surface of touch surface 116. For example, in one embodiment, haptic output device 118 may comprise an electrostatic display or any other device that applies voltages and currents instead of mechanical motion to generate a haptic effect. In such an embodiment, an electrostatic actuator may comprise a conducting layer and an insulating layer. In such an embodiment, the conducting layer may be any semiconductor or other conductive material, such as copper, aluminum, gold, or silver. And the insulating layer may be glass, plastic, polymer, or any other insulating material. Furthermore, the processor 102 may operate the electrostatic actuator by applying an electric signal to the conducting layer. The electric signal may be an AC signal that, in some embodiments, capacitively couples the conducting layer with an object near or touching touch surface 116. In some embodiments, the AC signal may be generated by a high-voltage amplifier. In other embodiments the capacitive coupling may simulate a friction coefficient or texture on the surface of the touch surface 116. For example, in one embodiment, the surface of touch surface 116 may be smooth, but the capacitive coupling may produce an attractive force between an object near the surface of touch surface 116. In some embodiments, varying the levels of attraction between the object and the conducting layer can vary the simulated texture on an object moving across the surface of touch surface 116 or vary the coefficient of friction felt as the object moves across the surface of touch surface 116. Furthermore, in some embodiments, an electrostatic actuator may be used in conjunction with traditional actuators to vary the simulated texture on the surface of touch surface 116. For example, the actuators may vibrate to simulate a change in the texture of the surface of touch surface 116, while at the same time; an electrostatic actuator may simulate a different texture, or other effects, on the surface of touch surface 116.

One of ordinary skill in the art will recognize that, in addition to varying the coefficient of friction, other techniques or methods can be used to, for example, simulate a texture on a surface. In some embodiments, a texture may be simulated or output using a flexible surface layer configured to vary its texture based upon contact from a surface reconfigurable haptic substrate (including, but not limited to, e.g., fibers, nanotubes, electroactive polymers, piezoelectric elements, or shape memory allows) or a magnetorheological fluid. In another embodiment, surface texture may be varied by raising or lowering one or more surface features, for example, with a deforming mechanism, air or fluid pockets, local deformation of materials, resonant mechanical elements, piezoelectric materials, micro-electromechanical systems ("MEMS") elements, thermal fluid pockets, MEMS pumps, variable porosity membranes, or laminar flow modulation.

In some embodiments an electrostatic actuator may be used to generate a haptic effect by stimulating parts of the body near or in contact with the touch surface 116. For example, in some embodiments an electrostatic actuator may stimulate the nerve endings in the skin of a user's finger or components in a stylus that can respond to the electrostatic actuator. The nerve endings in the skin, for example, may be stimulated and sense the electrostatic actuator (e.g., the capacitive coupling) as a vibration or some more specific sensation. For example, in one embodiment, a conducting layer of an electrostatic actuator may receive an AC voltage signal that couples with conductive parts of a user's finger. As the user touches the touch surface 116 and moves his or her finger on the touch surface, the user may sense a texture of prickliness, graininess, bumpiness, roughness, stickiness, or some other texture.

Further, in some embodiments, multiple actuators may be used to output haptic effects. This may serve to increase the range of effects that haptic output devices 118 can output. For example, in some embodiments, vibrating actuators may be used in coordination with electrostatic actuators to generate a broad range of effects. In still further embodiments, additional types of haptic output devices, such as devices configured to deform a touch surface, may be used in coordination with other haptic output devices, such as vibrating actuators.

Turning to memory 104, exemplary program components 124, 126, and 128 are depicted to illustrate how a device may be configured to generate haptic effects associated with an envelope in audio signals. In this example, a detection module 124 configures processor 102 to monitor touch surface 116 via sensor 108 to determine a position of a touch. For example, module 124 may sample sensor 108 in order to track the presence or absence of a touch and, if a touch is present, to track one or more of the location, path, velocity, acceleration, pressure, and/or other characteristics of the touch over time.

Haptic effect determination module 126 represents a program component that analyzes audio data, such as data from an audio effect, to select a haptic effect to generate. Particularly, module 126 comprises code that determines, based on the audio data, a type of haptic effect to output.

Haptic effect generation module 128 represents programming that causes processor 102 to generate and transmit a haptic signal to haptic output device 118, which causes haptic output device 118 to generate the selected haptic effect. For example, generation module 128 may access stored waveforms or commands to send to haptic output device 118. As another example, haptic effect generation module 128 may receive a desired type of effect and utilize signal processing algorithms to generate an appropriate signal to send to haptic output device 118. Some embodiments may utilize multiple haptic output devices in concert to output the haptic effect. In some embodiments, processor 102 may stream or transmit the haptic signal to the haptic output device 118.

Figure 1B:
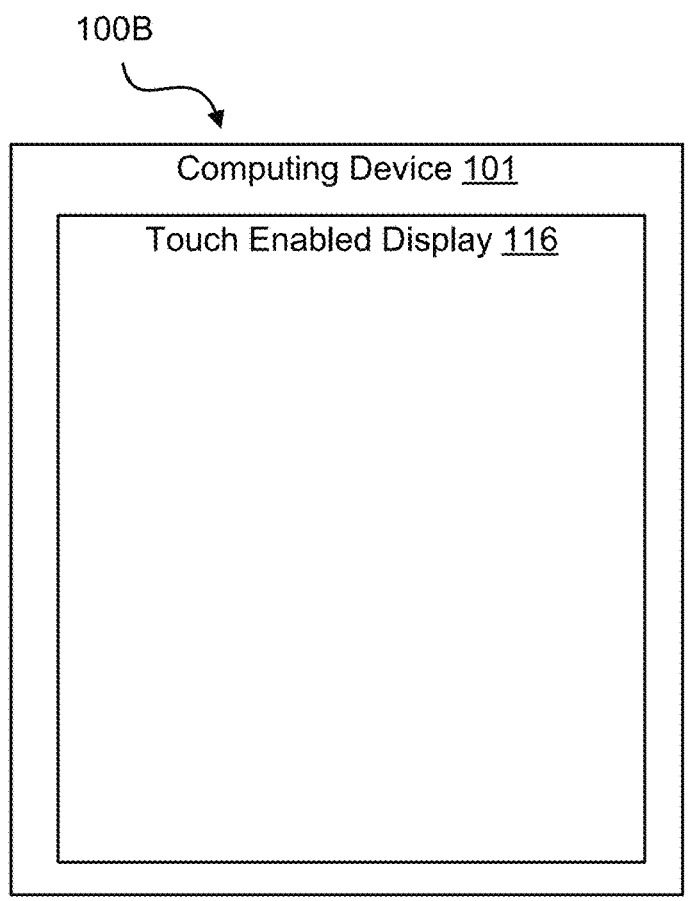
FIG. 1B shows an external view of one embodiment of the system shown in FIG. 1A.

A touch surface may or may not overlay (or otherwise correspond to) a display, depending on the particular configuration of a computing system. In FIG. 1B, an external view of a computing system 100B is shown. Computing device 101 includes a touch enabled display 116 that combines a touch surface and a display of the device. The touch surface may correspond to the display exterior or one or more layers of material above the actual display components.

Figure 1C:
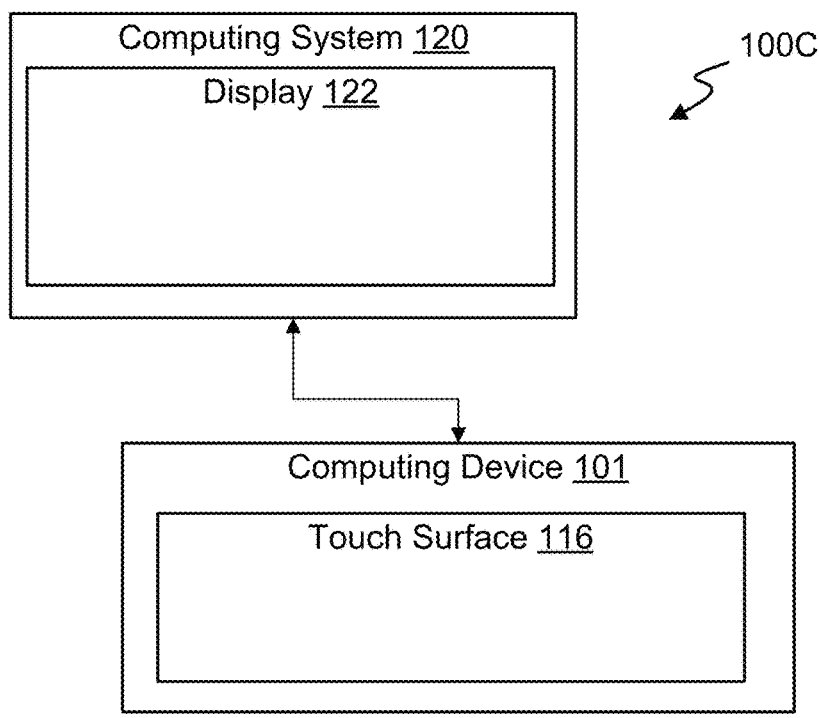
FIG. 1C illustrates an external view of another embodiment of the system shown in FIG. 1A.

FIG. 1C illustrates another example of a touch-enabled computing system 100C in which the touch surface does not overlay a display. In this example, a computing device 101 comprises a touch surface 116 which may be mapped to a graphical user interface provided in a display 122 that is included in computing system 120 interfaced to device 101. For example, computing device 101 may comprise a mouse, trackpad, or other device, while computing system 120 may comprise a desktop or laptop computer, set-top box (e.g., DVD player, DVR, cable television box), or another computing system. As another example, touch surface 116 and display 122 may be disposed in the same device, such as a touch enabled trackpad in a laptop computer comprising display 122. Whether integrated with a display or otherwise, the depiction of planar touch surfaces in the examples herein is not meant to be limiting. Other embodiments include curved or irregular touch enabled surfaces that are further configured to provide surface-based haptic effects.

Figure 2A:
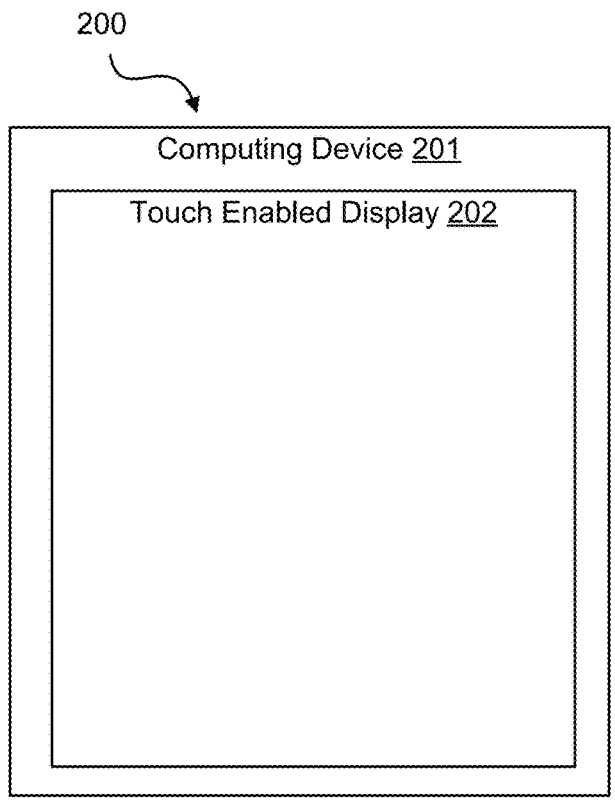
FIG. 2A illustrates an example embodiment for generating haptic effects associated with an envelope in audio signals.
Figure 2B:
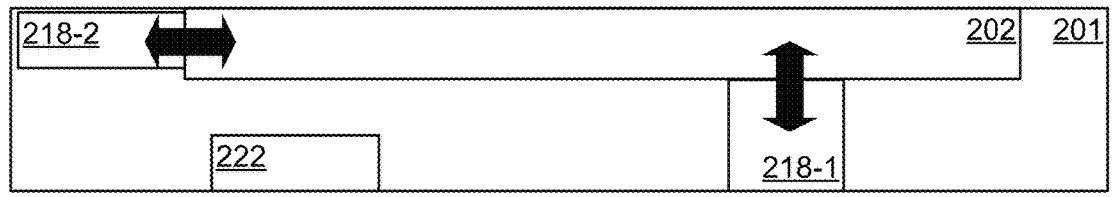
FIG. 2B illustrates an example embodiment for generating haptic effects associated with an envelope in audio signals.

FIGS. 2A-2B illustrate an example of devices that may generate haptic effects associated with an envelope in audio signals. FIG. 2A is a diagram illustrating an external view of a system 200 comprising a computing device 201 that comprises a touch enabled display 202. FIG. 2B shows a cross-sectional view of device 201. Device 201 may be configured similarly to device 101 of FIG. 1A, though components such as the processor, memory, sensors, and the like are not shown in this view for purposes of clarity.

As can be seen in FIG. 2B, device 201 features a plurality of haptic output devices 218 and an additional haptic output device 222. Haptic output device 218-1 may comprise an actuator configured to impart vertical force to display 202, while 218-2 may move display 202 laterally. In this example, the haptic output devices 218 and 222 are coupled directly to the display, but it should be understood that the haptic output devices 218 and 222 could be coupled to another touch surface, such as a layer of material on top of display 202. Furthermore, it should be understood that one or more of haptic output devices 218 or 222 may comprise an electrostatic actuator, as discussed above. Furthermore, haptic output device 222 may be coupled to a housing containing the components of device 201. In the examples of FIGS. 2A-2B, the area of display 202 corresponds to the touch area, though the principles could be applied to a touch surface completely separate from the display.

In one embodiment, haptic output devices 218 each comprise a piezoelectric actuator, while additional haptic output device 222 comprises an eccentric rotating mass motor, a linear resonant actuator, or another piezoelectric actuator. Haptic output device 222 can be configured to provide a vibrotactile haptic effect in response to a haptic signal from the processor. The vibrotactile haptic effect can be utilized in conjunction with surface-based haptic effects and/or for other purposes. For example, each actuator may be used in conjunction to output a vibration, simulate a texture, or vary the coefficient of friction on the surface of display 202.

In some embodiments, either or both haptic output devices 218-1 and 218-2 can comprise an actuator other than a piezoelectric actuator. Any of the actuators can comprise a piezoelectric actuator, an electromagnetic actuator, an electroactive polymer, a shape memory alloy, a flexible composite piezo actuator (e.g., an actuator comprising a flexible material), electrostatic, and/or magnetostrictive actuators, for example. Additionally, haptic output device 222 is shown, although multiple other haptic output devices can be coupled to the housing of device 201 and/or haptic output devices 222 may be coupled elsewhere. Device 201 may comprise multiple haptic output devices 218-1/218-2 coupled to the touch surface at different locations, as well.

Figure 3:
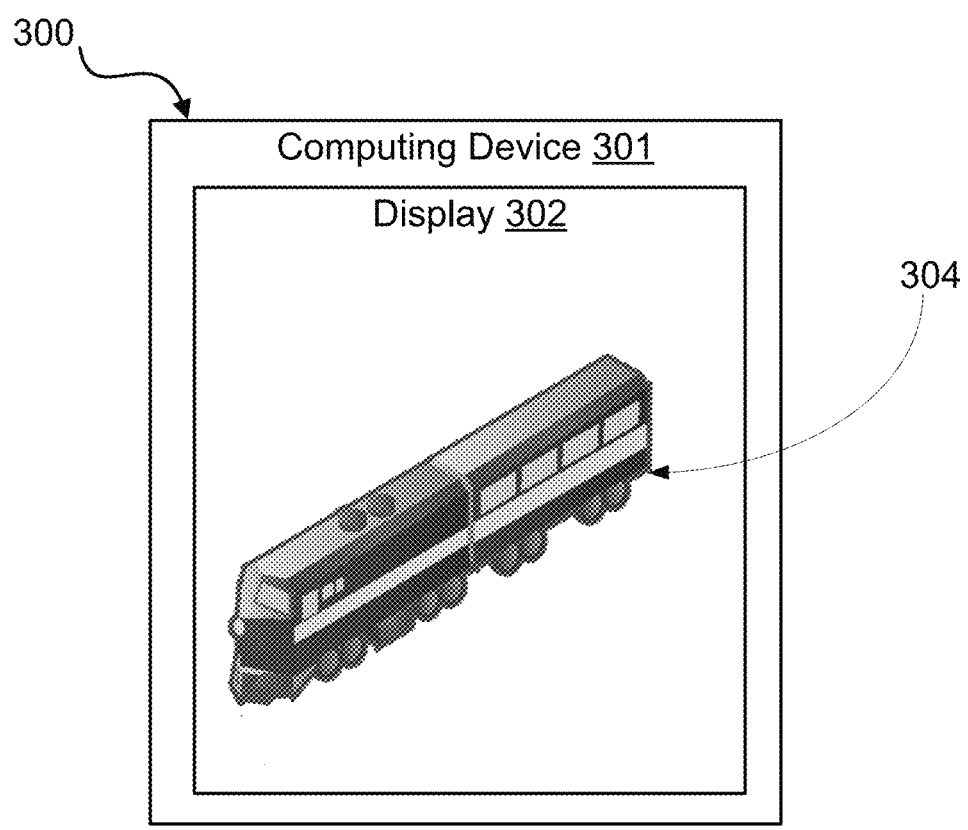
FIG. 3 illustrates an example embodiment for generating haptic effects associated with an envelope in audio signals according to one embodiment.

Turning now to FIG. 3, FIG. 3 shows one embodiment of a system for generating haptic effects associated with an envelope in audio signals according to the present disclosure. The system 300 shown in FIG. 3 comprises a computing device 301, with a display 302 showing a video comprising a train 304. In some embodiments computing device 301 may comprise a handheld computing device, e.g., a mobile phone, a tablet, a music player, or a laptop computer. In another embodiment, computing device 301 may comprise a multifunction controller. For example, a controller for use in a kiosk, ATM, or other computing device. Further, in one embodiment, computing device 301 may comprise a controller for use in a vehicle.

The video 304 may further comprise audible effects played by audio output devices (e.g., speakers or headphones) coupled to the computing device 301 (not shown in FIG. 3). Embodiments of the present disclosure comprise methods for determining haptic effects based on the audio signal. For example, some embodiments may separate the audio signal from the video signal, and then perform various operations, discussed in further detail below, to determine haptic effects to output alongside the audio track.

In some embodiments, display 302 may comprise a touch enabled display. Further, rather than displaying a video, display 302 may provide the user with a graphical user interface, e.g., a graphical user interface for a kiosk, ATM, stereo system, car dashboard, telephone, computer, music player, or some other graphical user interface known in the art. In such an embodiment, computing device 301 may determine haptic effects based on audio signals associated with the graphical user interface. For example, in some embodiments the graphical user interface may comprise audio effects output when the user interacts with icons, buttons, or other interface elements. In some embodiments, computing device 301 may further determine haptic effects associated with one or more of these audio effects. In some embodiments, the computing device 301 may derive haptic effects from an envelope in the audio signal or any other sensor derived signal, e.g., signals from sensors such as user interfaces, accelerometers, gyroscopes, inertial measurement units, etc.

In some embodiments, a video signal may not be included. For example, in some embodiments, haptic effects may be played alongside an audio track that is not associated with a video. In such an embodiment, the systems and methods disclosed herein may operate on the audio signal, in real time, as the signal is being played or at a time in advance of the signal being played. For example, in some embodiments, an audio signal may be processed to determine a haptic track, which is stored on a data store for playing in the future. In such an embodiment, the haptic track may be determined by the computing device that plays the haptic track. In other embodiments, the haptic track may be created by the author or distributor of the audio track. In such an embodiment, the author or distributor may distribute the haptic track along with the audio track.

Figure 4:
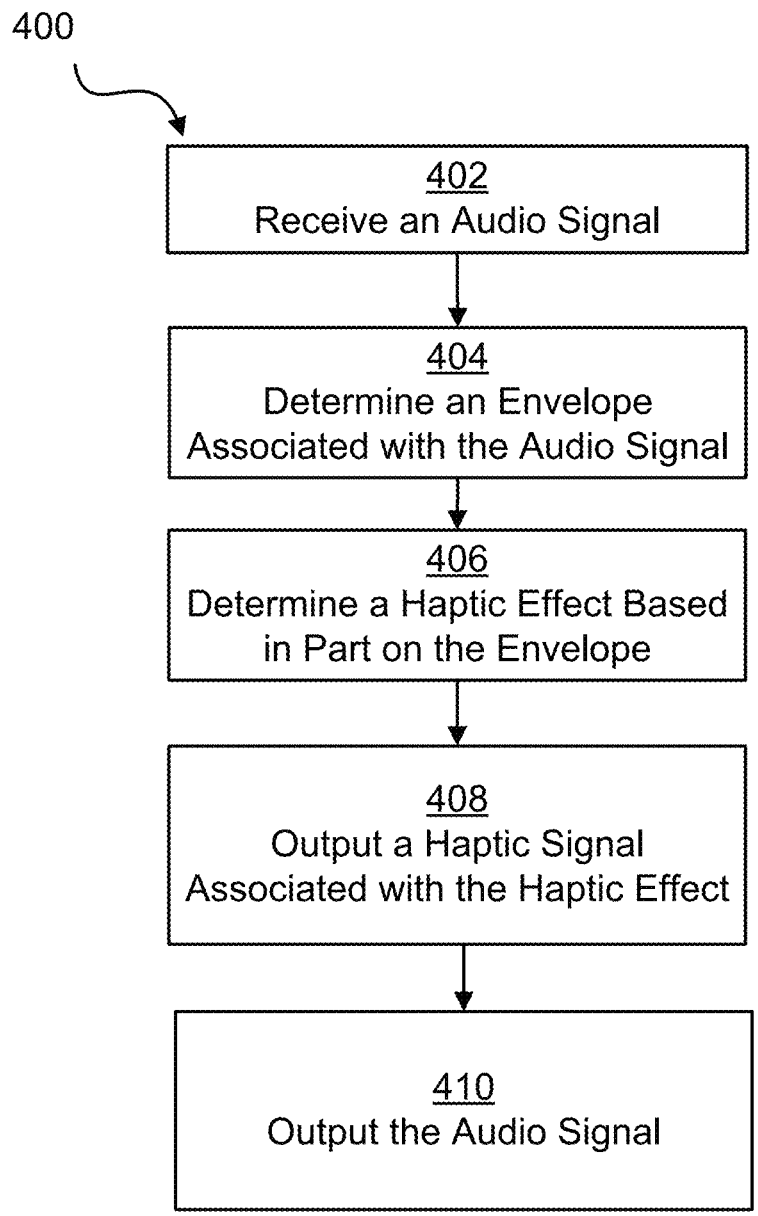
FIG. 4 illustrates a flow chart for a method for generating haptic effects associated with an envelope in audio signals according to one embodiment.

Illustrative Methods for Generating Haptic Effects Associated with an Envelope in Audio Signals FIG. 4 is a flowchart showing illustrative method 400 for generating haptic effects associated with an envelope in audio signals. In some embodiments, the steps in flow chart 400 may be implemented in program code executed by a processor, for example, the processor in a general purpose computer, mobile device, or server. In some embodiments, these steps may be implemented by a group of processors. In some embodiments the steps shown in FIG. 4 may be performed in a different order. Alternatively, in some embodiments, one or more of the steps shown in FIG. 4 may be skipped or additional steps not shown in FIG. 4 may be performed. The steps in FIG. 4 are described with regard to an audio signal. However, in some embodiments, the method may be used to determine haptic effects associated with other types of signals, e.g., pressure, acceleration, velocity, or temperature signals. The steps below are described with reference to components described above with regard to system 100 shown in FIG. 1A.

The method 400 begins when processor 102 receives an audio signal 402. In some embodiments the audio signal may comprise a signal associated with a video playing on computing device 101. In other embodiments, the audio signal may comprise a signal associated with an audio file that is currently playing on computing device 101. In still other embodiments, the audio signal may be associated with an audio file that is stored locally on a computing device 101 or stored on a remote server. For example, in some embodiments, the audio signal may comprise an audio file that is stored on a server and downloaded to the user on demand.

The method 400 continues when processor 102 determines an envelope associated with the audio signal 404. In such an embodiment, an envelope may comprise a curve that closely follows the time and frequency content of an audio signal. Such a system may then multiply this envelope by another signal. Determining the envelope of an audio signal may enable an audio to haptics system to locate areas where the audio signal is close to noise or is very low in magnitude. Embodiments for determining an envelope of an audio signal are described in further detail below.

The method 400 continues when processor 102 determines a haptic effect based on the envelope 406. In some embodiments, the haptic effect may comprise a vibration output by one or more haptic output device(s) 118. In some embodiments, this vibration may be used to enhance the user's perception of an audio track playing on the computing device 101. Similarly, in some embodiments, the first haptic effect may comprise a variation in the coefficient of friction on touch surface 116. In other embodiments, the haptic effect may comprise a simulated texture on the surface of touch surface 116 (e.g., the texture of one or more of: water, grass, ice, metal, sand, gravel, brick, fur, leather, skin, fabric, rubber, leaves, or any other available texture).

In some embodiments, processor 102 may rely on programming contained in haptic effect determination module 126 to determine the haptic effect. For example, the processor 102 may access drive signals stored in memory 104 and associated with particular haptic effects. As another example, a signal may be generated by accessing a stored algorithm and inputting parameters associated with an effect. For example, an algorithm may output data for use in generating a drive signal based on amplitude and frequency parameters. As another example, a haptic signal may comprise data sent to an actuator to be decoded by the actuator. For instance, the actuator may itself respond to commands specifying parameters such as amplitude and frequency.

Further, in some embodiments, users may be able to select a vibration, texture, variance in the coefficient of friction, or other haptic effect associated with an audio file in order to customize computing device 101. For example, in some embodiments, a user may select a haptic effect such as a surface texture to allow for personalization of the feel of a touch interface. In some embodiments, this haptic effect may be associated with a ringtone, e.g., for an incoming call, email, text message, alarm, or other event. In some embodiments, the user may select these personalized haptic effects or surface textures through modifying settings or downloading software associated with particular effects. In other embodiments, the user may designate effects through detected interaction with the device. In some embodiments, this personalization of haptic effects may increase the user's sense of ownership and the connection between the user and his or her device.

In still other embodiments, device manufacturers, artists, videographers, or software developers may select distinctive haptic effects, such as surface textures, to brand their devices, user interfaces, or artistic works (e.g., songs, videos, or audio tracks). In some embodiments, these haptic effects may be unique to branded devices and similar to other distinctive elements that may increase brand awareness. For example, many mobile devices and tablets may comprise a custom or branded home screen environment. For example, in some embodiments, devices produced by different manufacturers may comprise the same operating system; however, manufacturers may distinguish their devices by modifying this home screen environment. Similarly, videos or audio tracks produced by a certain company may comprise a specific type of haptic effect. Thus, in some embodiments, some device manufacturers, production companies, or software developers may use haptic effects such as textures or friction based effects to create a unique and differentiated user experience.

In some embodiments, the envelope may be used to determine whether to output haptic effects. For example, in some embodiments, haptic effects may be generated automatically from an audio track. However, it may be desirable to associate haptic effects with only certain audible effects. For example, in some embodiments, dialog, background noise, theme music, or some other type of audible effect may not be associated with a haptic effect. An envelope determination may be used to determine these types of audible effects, and then ensure that no haptic effects are associated with them. For example, background noise may be below a threshold level in the envelope. Thus, an automatic haptic conversion unit may determine not to output a haptic effect associated with this background noise. Similarly, an automatic hapic conversion unit may determine not to output a haptic effect associated with speech, special effects, or audible effects generated by a certain source (e.g., a musical instrument, speaker, effect unit, etc.).

In some embodiments, the processor 102 may determine a haptic effect by multiplying the envelope by a known frequency. In some embodiments, this may depend on the type of actuator. For example, in the case of the LRA, the envelope could be multiplied by a frequency of, e.g., 125, 150, 175, or 200 Hz to determine a haptic signal. Further, in some embodiments, the envelope itself may be output as the haptic signal. For example, in the case of the ERM the envelope could be sent to the haptic effect as is. Further, as described above the envelope signal could be used for other types of haptic effects; for example, an envelope signal could be modified based on the velocity or acceleration of a user's finger in order to output a texture on a touch surface. Similarly, the envelope could be used by an actuator configured to vary the perceived coefficient of friction on a touch surface.

The method 400 continues when processor 102 outputs a haptic signal associated with the haptic effect 408. The processor 102 outputs the haptic signal to a haptic output device 118 configured to output the haptic effect. In some embodiments, haptic output device 118 may output the haptic effect onto touch surface 116. In some embodiments, haptic output device 118 may comprise traditional actuators such as piezoelectric actuators or electric motors coupled to touch surface 116 or other components within computing device 101. In other embodiments haptic output device 118 may comprise electrostatic actuators configured to simulate textures or vary coefficients of friction using electrostatic fields. In some embodiments, processor 102 may control a plurality of haptic output devices to simulate multiple haptic effects. For example, in one embodiment, processor 102 may control an electrostatic actuator to simulate a texture on the surface of touch surface 116 and processor 102 may further control other haptic output devices 118 to simulate other features. For example, haptic output devices 118 may comprise actuators configured to output other effects, such as vibrations configured to simulate barriers, detents, movement, or impacts on touch surface 116. In some embodiments, processor 102 may coordinate the effects so the user can feel a plurality of effects together when interacting with touch surface 116.

Then processor 102 outputs the audio signal 410. In some embodiments, processor 102 may output the audio signal to an audio output device such as a speaker, headphone, or ear bud. In some embodiments, the audio output device may be integrated into computing device 101. In other embodiments, the audio output device may be coupled to computing device 101. Further, in some embodiment, the audio signal may be synchronized to the haptic effects, e.g., in some embodiments, the haptic effect may be output substantially simultaneously as a corresponding audio effect.

Illustrative Methods for Identifying Envelopes in Audio Signals

Figure 5:
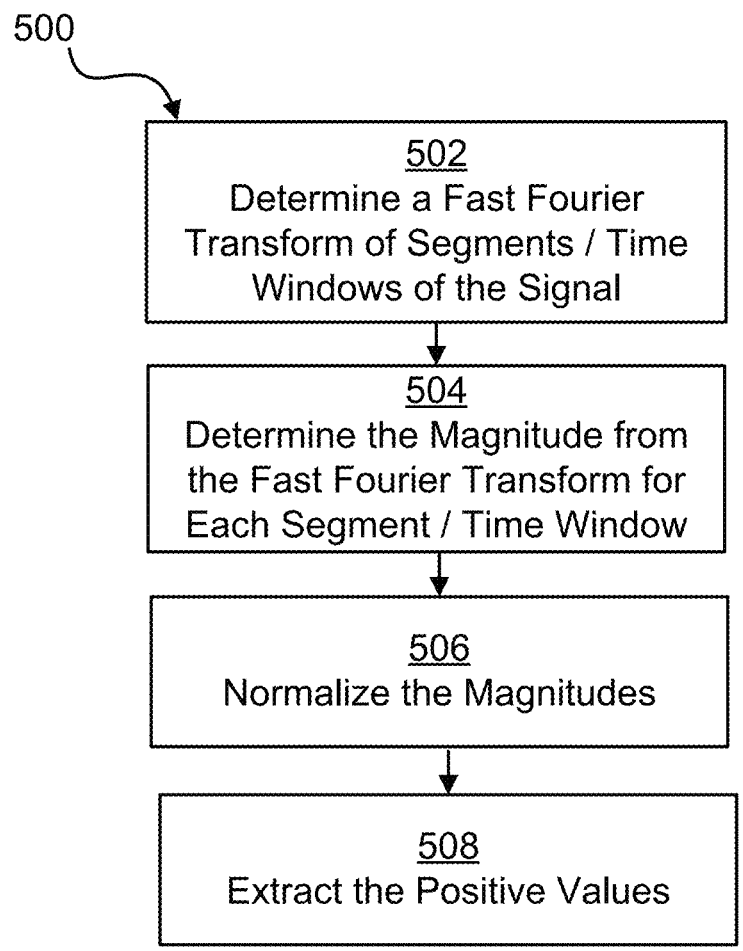
FIG. 5 illustrates a flow chart for a method for determining an envelope of an audio signal according to one embodiment.

FIG. 5 is a flowchart showing an illustrative method 500 for identifying an envelope in an audio signal, which may be used for determining haptic effects associated with the audio signal. In some embodiments, the steps shown in FIG. 5 may be implemented in program code executed by a processor, for example, the processor in a general purpose computer, mobile device, or server. In some embodiments, these steps may be implemented by a group of processors. In some embodiments the steps shown in FIG. 5 may be performed in a different order. Alternatively, in some embodiments, one or more of the steps in FIG. 5 may be skipped, or additional steps not shown in FIG. 5 may be performed. The steps in FIG. 5 are described with regard to an audio signal. However, in some embodiments, the method may be used to determine haptic effects associated with other types of signals, e.g., pressure, acceleration, velocity, or temperature signals.

As shown in FIG. 5, the method 500 begins at step 502 when processor 102 determines a Fast Fourier Transform (FFT) of one or more segments or time windows within the audio signal. In some embodiments, a segment may correspond to samples of the audio signal in a specific time window. Further, in some embodiments, the segments can be distinct or alternatively, can be overlapping. The Fast Fourier Transform (FFT) of the audio signal taken in small time windows is the basis of the spectrogram of the audio signal. In some embodiments, the spectrogram may be represented in a 3D plot with time in one axis, frequency in another and amplitude of the specific frequencies in another axis. The spectrogram for an audio signal is shown as plot 600 in FIG. 6, described in further detail below.

Next at step 504 the processor 102 determines a magnitude from the FFT for each segment or each time window. In some embodiments, the processor 102 may determine the magnitude on a logarithmic scale. Further, in some embodiments this may be a sum of all FFT frequencies magnitudes or the average over all these values.

Then at step 506 the processor 102 normalizes the magnitudes. In some embodiments, the processor 102 may normalize the values between negative one and one. The normalized signal is shown in FIG. 6 as signal 654 in plot 650.

Next at step 508 the processor 102 determines the positive values. For example, the processor may set all values that are below zero to zero, and then analyze only the non-zero values. The resulting positive values correspond to the envelope of the signal.

Figure 6:
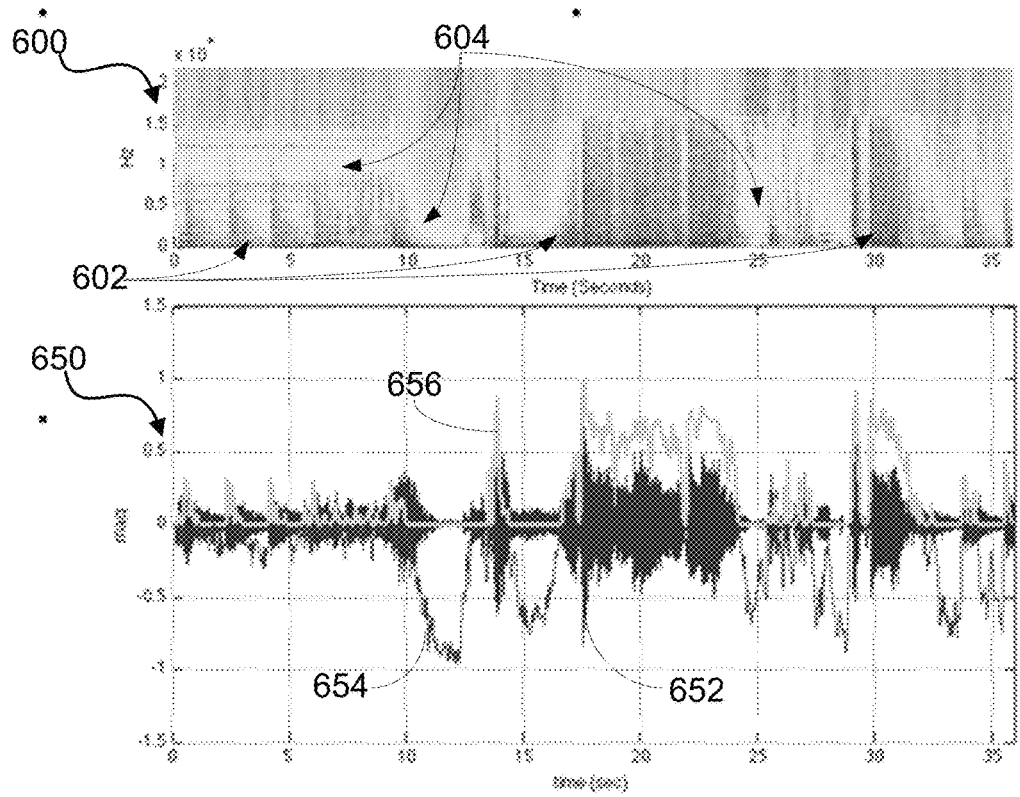
FIG. 6 illustrates a graph of the spectrogram of an audio signal and the same audio signal in the time domain.

FIG. 6 illustrates a graph of the spectrogram of an audio signal and the time domain of the same audio signal. As shown in FIG. 6, the spectrogram of an audio signal is shown as graph 600. The spectrogram comprises a plot of the Short Time Fourier Transform (STFT) of the segments of the audio signal in small time windows. In some embodiments, the spectrogram is represented in a three dimensional plot with time in one axis, frequency in another, and amplitude of the specific frequencies in the third axis. Plot 600 comprises an example of two dimensional spectrogram of an audio signal. In plot 600, the third dimension is depicted by the darkness of the plot, with darker colors meaning a higher magnitude. As shown in the plot, there is higher intensity at lower frequencies, represented by the dark plot at low magnitudes (highlighted by arrows 602). As the frequency increases, the intensity reduces, thus the color becomes lighter (highlighted by arrows 604).

Further, as shown in FIG. 6, plot 650 comprises the time domain of the audio signal represented by dark line 652. The normalized audio signal is shown by gray line 654. The envelope signal is shown by light gray line 656. In some embodiments, this envelope will correspond to events in the audio signal. In some embodiments, the processor 102 may use these events to determine locations for haptic effects associated with the audio signal.

Figure 7:
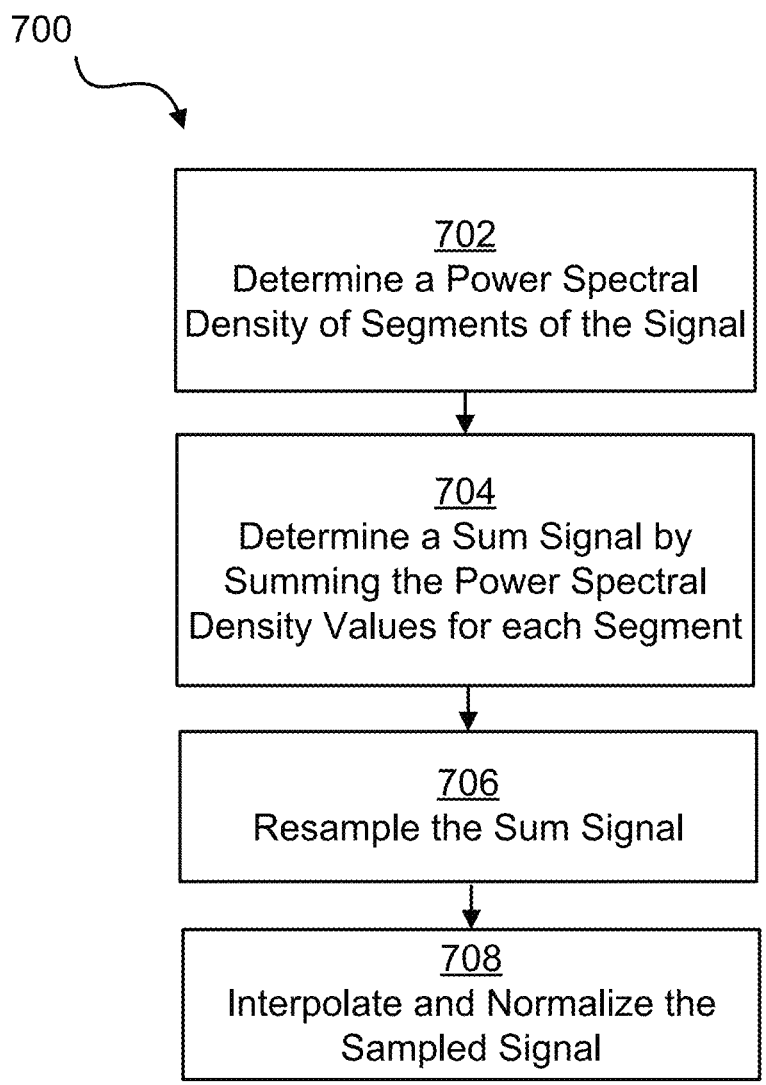
FIG. 7 illustrates a flow chart for a method for determining an envelope of an audio signal according to one embodiment.

Turning now to FIG. 7, FIG. 7 illustrates a flow chart for a method 700 for determining an envelope of an audio signal according to one embodiment. FIG. 7 is a flowchart showing an illustrative method 700 for identifying an envelope in an audio signal, which may be used for determining haptic effects associated with the audio signal. In some embodiments, the steps shown in FIG. 7 may be implemented in program code executed by a processor, for example, the processor in a general purpose computer, mobile device, or server. In some embodiments, these steps may be implemented by a group of processors. In some embodiments the steps shown in FIG. 7 may be performed in a different order. Alternatively, in some embodiments, one or more of the steps in FIG. 7 may be skipped, or additional steps not shown in FIG. 7 may be performed. The steps in FIG. 7 are described with regard to an audio signal. However, in some embodiments, the method may be used to determine haptic effects associated with other types of signals, e.g., pressure, acceleration, velocity, or temperature signals.

As shown in FIG. 7, the method 700 begins at 702 when the processor 102 determines the power spectral density of one or more segments of the audio signal. In some embodiments, the processor 102 may determine the power spectral density for each of the audio signal's contiguous time windows, for a range of frequencies covering most of the frequencies in the audio signal. In other embodiments, the processor 102 may determine the power spectral density for a more narrow range of frequencies in the audio signal.

At step 704 the processor 102 determines a sum signal by summing the power spectral density values for each time segment. In some embodiments, the time window may comprise variable lengths of time. In some embodiments, this length of time may comprise less than 100 ms. In some embodiments, the processor 102 may, for each time window, sum the power spectral density values for all the frequencies in a range of frequencies. In some embodiments, summing the power spectral density values for each time window enables each time window to be represented as a single value. For example, in some embodiments each window may be represented as a single numerical value. Further, in some embodiments, the processor 102 may determine a signal S, which is represents these values, e.g., a signal representing the sum of power spectral density values.

Then at step 706 the processor 102 resamples the sum signal. In some embodiments, the processor 102 may sample the signal S for a given length of the time window. In some embodiments, the sampling frequency may be based in part on the length of each time window. For example, in one embodiment, if the time window is X ms and the sampling frequency is Fs, each value will be replaced/sampled by (X*Fs/1000) values.

Next at step 708 the processor 102 interpolates and normalizes the sample signal. The processor 102 may use one of many known conventional techniques for interpolation, e.g., linear, polynomial, spline, or closest. In some embodiments, the use of different interpolation methods will result in different values and as a result different haptic tracks. In some embodiments, the processor 102 may interpolate in order to match the sampling frequency of the audio signal. Further, in some embodiments, the processor 102 may then determine the square root of the interpolated signal. In some embodiments, the resulting signal represents an envelope of the original audio signal.

Figure 8:
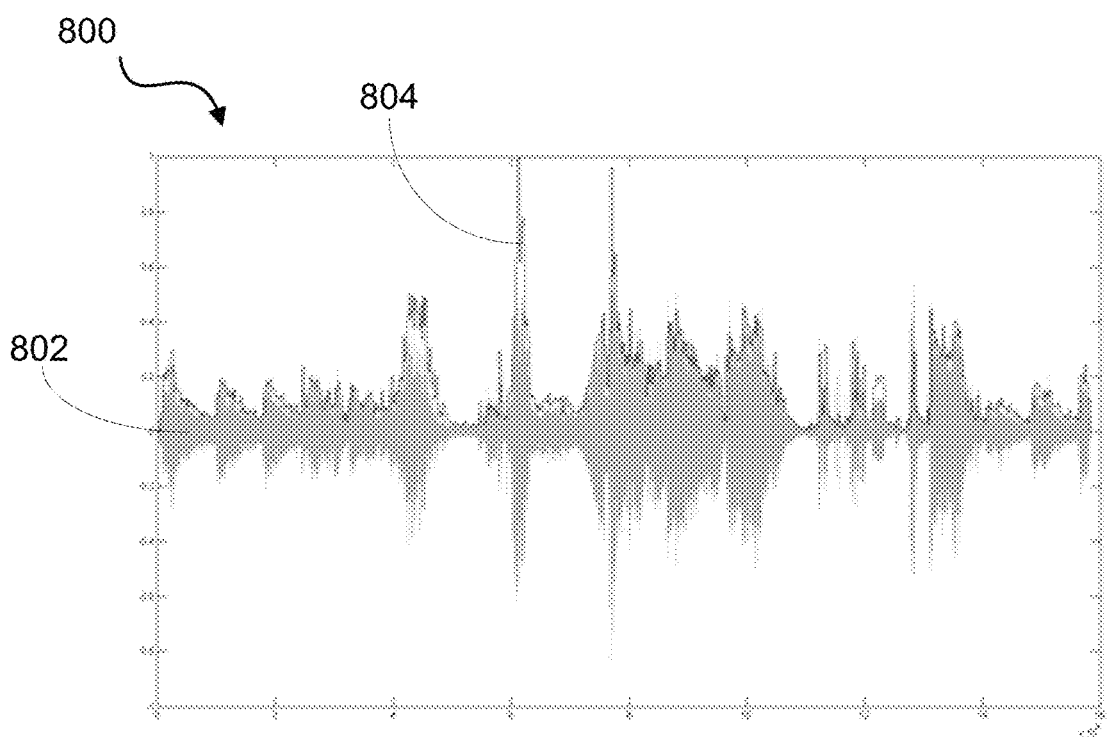
FIG. 8 illustrates a graph of an envelope determined according to method 700 described with regard to FIG. 7.

FIG. 8 illustrates a plot of an envelope 800 determined according to method 700 described with regard to steps 702-708 shown in FIG. 7. As shown in FIG. 8, plot 800 shows an audio signal as gray line 802, and the determined envelope for this audio signal is shown as dark line 804.

Illustrative Method for Cleaning the Identified Envelope Signal

Figure 9:
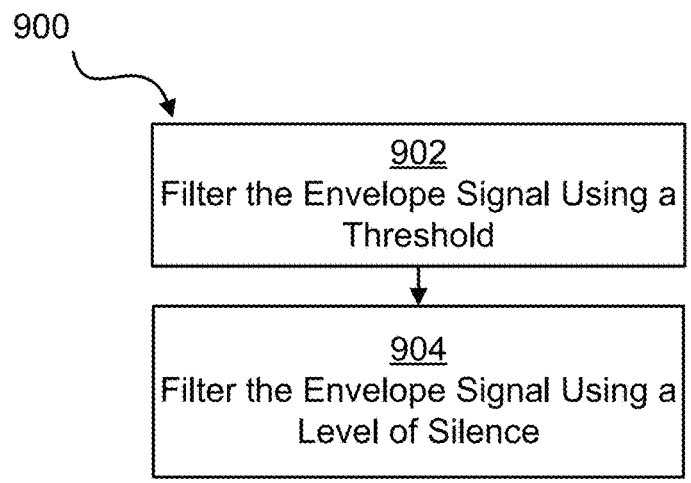
FIG. 9 illustrates a flow chart for a method for cleaning the determined envelope signal according to one embodiment.

FIG. 9 is a flowchart showing an illustrative method 900 for cleaning an envelope signal, which may be used for determining haptic effects associated with the audio signal. In some embodiments, the steps shown in FIG. 9 may be implemented in program code executed by a processor, for example, the processor in a general purpose computer, mobile device, or server. In some embodiments, these steps may be implemented by a group of processors. In some embodiments the steps shown in FIG. 9 may be performed in a different order. Alternatively, in some embodiments, one or more of the steps in FIG. 9 may be skipped, or additional steps not shown in FIG. 9 may be performed. The steps in FIG. 9 are described with regard to an audio signal. However, in some embodiments, the method may be used to determine haptic effects associated with other types of signals, e.g., pressure, acceleration, velocity, or temperature signals.

As shown in FIG. 9, the method 900 begins at step 902 when processor 102 filters the envelope signal using a threshold. This threshold may comprise a lower limit of the envelope, below which signals are ignored or are set to zero. In some embodiments, the threshold may comprise a value between 0 and 1. For example, in some embodiments, the threshold may comprise a value of, 0.1 or 0.2. In some embodiments, the threshold may comprise a pre-set threshold. In some embodiments, during the filtering, the processor 102 nullifies all or substantially all values that are below the threshold. For example, in one embodiment, background noise in an audio file may be below a threshold level in the envelope. Thus, an automatic haptic conversion unit may determine not to output a haptic effect associated with this background noise. Similarly, an automatic haptic conversion unit may determine not to output a haptic effect associated with speech, special effects, or audible effects generated by a certain source (e.g., a musical instrument, speaker, effect unit etc.).

Next, at step 904, the processor 102 filters the envelope signal using a level of silence. In some embodiments, the level of silence may comprise a percentage value set by the user or designer as a parameter of audio to haptics conversion. For example, in some embodiments, the level of silence may comprise a percentage, e.g., 30%, 40%, or 50%. In some embodiments, this percentage corresponds to the percentage of the haptic signal samples to be filtered out (nullified) in the haptic track. In such an embodiment, sample values below a threshold corresponding to this percentage may be removed. For example, in one embodiment, the sample values of the envelope signal samples may be sorted in an ascending order. The threshold corresponding to the silence level (e.g., X %) can be estimated as a value ranked at (X/100)*total number of samples in the envelope signal. The samples below this value can then be filtered out (nullified). For example, for a haptic silence value of 60%, the processor 102 may nullify all samples with values that are less than the threshold corresponding to the 60% haptic silence level.

Figure 10:
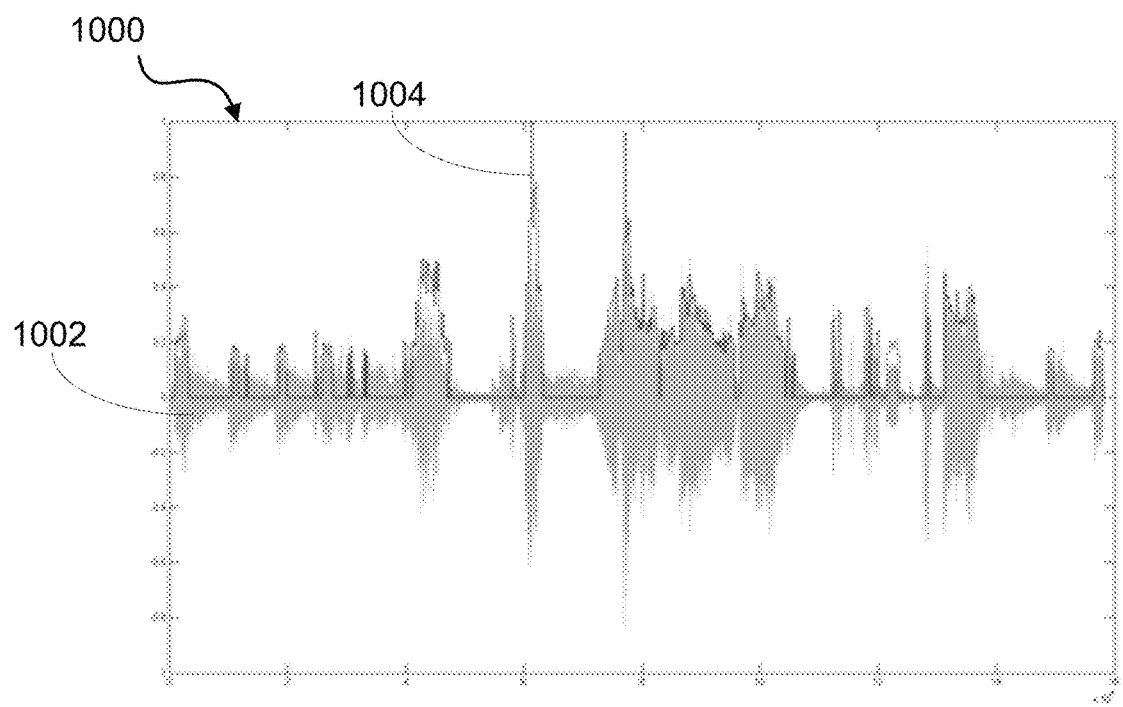
FIG. 10 illustrates a graph of a cleaned envelope signal.

FIG. 10 illustrates a plot 1000 of a cleaned envelope signal. As shown in FIG. 10, plot 1000 comprises an audio signal shown as gray line 1002. The cleaned envelope signal is shown as dark line 1004. As shown in FIG. 10, the cleaned envelope signal comprises a 60% haptic silence threshold, thus the processor 102 may nullified all values that are less than the 60% threshold.

Advantages of Systems and Methods for Generating Haptic Effects Associated with an Envelope in Audio Signals There are numerous advantages of systems and methods for generating haptic effects associated with an envelope in audio signals. In the past, the envelope was computed by taking the absolute value of the audio signal over specific time duration, and then low passing that signal or taking the maximum value. However, this approach creates haptic effects in places where the audio signal is very small or noisy. Thus, the haptic effects are undesirable, e.g., because they are of low quality or are not associated with the appropriate events in the audio file.

In some embodiments, the envelope contains important information related to the magnitude of the audio event, the timing, and the noise floor. This may be used for automatic haptic conversion of a signal, because accurately determining the envelope allows the automatic conversion to have a cleaner signal. Further a properly determined envelope may comprise more contrast, which enables haptic effects to be output along with important events in the audio signal, and not output with less important events, e.g., background noise. The systems and methods described herein can determine an appropriate level of contrast, which can be used to determine compelling haptic effects. Furthermore, the systems and methods described above allow the designer/user to select a haptic silence threshold, which enables the designer/user to control how haptic effects will be generated. This may again lead to more compelling haptic effects.

General Considerations

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process that is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered. Accordingly, the above description does not bound the scope of the claims.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

Embodiments in accordance with aspects of the present subject matter can be implemented in digital electronic circuitry, in computer hardware, firmware, software, or in combinations of the preceding. In one embodiment, a computer may comprise a processor or processors. The processor comprises or has access to a computer-readable medium, such as a random access memory (RAM) coupled to the processor. The processor executes computer-executable program instructions stored in memory, such as executing one or more computer programs including a sensor sampling routine, selection routines, and other routines to perform the methods described above.

Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example tangible computer-readable media, that may store instructions that, when executed by the processor, can cause the processor to perform the steps described herein as carried out, or assisted, by a processor. Embodiments of computer-readable media may comprise, but are not limited to, all electronic, optical, magnetic, or other storage devices capable of providing a processor, such as the processor in a web server, with computer-readable instructions. Other examples of media comprise, but are not limited to, a floppy disk, CD-ROM, magnetic disk, memory chip, ROM, RAM, ASIC, configured processor, all optical media, all magnetic tape or other magnetic media, or any other medium from which a computer processor can read. Also, various other devices may include computer-readable media, such as a router, private or public network, or other transmission device. The processor, and the processing, described may be in one or more structures, and may be dispersed through one or more structures. The processor may comprise code for carrying out one or more of the methods (or parts of methods) described herein.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations and/or additions to the present subject matter as would be readily apparent to one of ordinary skill in the art.

What is claimed:

1. A system for synchronizing a haptic track comprising: a processor configured to:
   receive an audio signal;
   receive data associated with the haptic track;
   synchronize the haptic track to the audio signal based in part on an envelope associated with the audio signal;
   determine a haptic effect to be output by a haptic output device based in part on the audio signal and the haptic track; and
   store the haptic effect in the haptic track on a data store.

2. The system of claim 1, wherein the haptic effect comprises one or more of: a variation in coefficient of friction, a simulated texture, or a vibration.

3. The system of claim 1, wherein the processor is configured to determine the envelope by:
   determining a Fast Fourier Transform of the audio signal within two or more time windows;
   determining a magnitude for the Fast Fourier Transform for each time window;
   determining a normalized signal by normalizing the magnitudes; and
   determining positive values from the normalized signal.

4. The system of claim 3, wherein the time windows are overlapping.

5. The system of claim 4, wherein the envelope is the positive values of the normalized signal.

6. The system of claim 1, wherein the processor is configured to determine the envelope by:
   determining a power spectral density of the audio signal within two or more time windows;
   determining a sum signal by summing the power spectral density values for each time window;
   sampling the sum signal to determine a sample signal; and
   interpolating and normalizing the sample signal.

7. A method for synchronizing a haptic track comprising:
   receiving an audio signal;
   receiving data associated with the haptic track;
   synchronizing the haptic track to the audio signal based in part on an envelope associated with the audio signal;
   determining a haptic effect to be output by a haptic output device based in part on the audio signal and the haptic track; and
   storing the haptic effect in the haptic track on a data store.

8. The method of claim 7, wherein the haptic effect comprises one or more of: a variation in coefficient of friction, a simulated texture, or a vibration.

9. The method of claim 7, wherein the envelope associated with the audio signal comprises a signal determined by:
   determining a Fast Fourier Transform of the audio signal within two or more time windows;
   determining a magnitude for the Fast Fourier Transform for each time window;
   determining a normalized signal by normalizing the magnitudes; and
   determining positive values from the normalized signal.

10. The method of claim 9, wherein the time windows are overlapping.

11. The method of claim 9, wherein the envelope is the positive values of the normalized signal.

12. The method of claim 7, wherein the envelope associated with the audio signal comprises a signal determined by:
    determining a power spectral density of the audio signal within two or more time windows;
    determining a sum signal by summing the power spectral density values for each time window;
    sampling the sum signal to determine a sample signal; and
    interpolating and normalizing the sample signal.

13. The method of claim 12, wherein the envelope is the interpolated and normalized sample signal.

14. The method of claim 7, further comprising filtering the envelope.

15. The method of claim 14, wherein filtering the envelope signal comprises one or more of: filtering the envelope signal using a threshold and filtering the envelope using a level of haptic silence.

16. A non-transitory computer readable medium comprising program code, which when executed by a processor, is configured to cause the processor to:
    receive an audio signal;
    receive data associated with a haptic track;
    synchronize the haptic track to the audio signal based in part on an envelope associated with the audio signal;
    determine a haptic effect to be output by a haptic output device based in part on the audio signal and the haptic track; and
    store the haptic effect in the haptic track on a data store.

17. The non-transitory computer readable medium of claim 16, wherein the haptic effect comprises one or more of: a variation in coefficient of friction, a simulated texture, or a vibration.

18. The non-transitory computer readable medium of claim 16, wherein the envelope associated with the audio signal comprises a signal determined by:
    determining a Fast Fourier Transform of the audio signal within two or more time windows;
    determining a magnitude for the Fast Fourier Transform for each time window;
    determining a normalized signal by normalizing the magnitudes; and
    determining positive values from the normalized signal.

19. The non-transitory computer readable medium of claim 18, wherein the time windows are overlapping.

20. The non-transitory computer readable medium of claim 18, wherein the envelope is the positive values of the normalized signal.

21. The system of claim 1, wherein the processor is further configured to output a haptic signal associated with the haptic effect to the haptic output device.

22. The method of claim 7, further comprising outputting a haptic signal associated with the haptic effect to the haptic output device.

23. The non-transitory computer readable medium of claim 16, further comprising program code, which when executed by the processor is configured to cause the processor to output a haptic signal associated with the haptic effect to the haptic output device.

* * * * *